United States Patent
Wang et al.

(10) Patent No.: US 10,356,105 B2
(45) Date of Patent: Jul. 16, 2019

(54) SMART AUTHENTICATION FRICTION LEVEL ADJUSTED BASED ON CIRCUMSTANCES

(71) Applicant: Microsoft Technology Licensing, LLC, Redmond, WA (US)

(72) Inventors: Xuan Wang, Bellevue, WA (US); Ananda Sarkar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/182,428

(22) Filed: Jun. 14, 2016

(65) Prior Publication Data

US 2017/0359355 A1 Dec. 14, 2017

(51) Int. Cl.
*H04L 29/06* (2006.01)
*G06F 21/31* (2013.01)
*H04W 12/06* (2009.01)

(52) U.S. Cl.
CPC .......... *H04L 63/108* (2013.01); *G06F 21/316* (2013.01); *H04L 63/08* (2013.01); *H04L 63/107* (2013.01); *H04W 12/06* (2013.01); *G06F 2221/2111* (2013.01); *G06F 2221/2137* (2013.01)

(58) Field of Classification Search
CPC ..... H04L 63/08; H04L 63/107; H04L 63/108; H04L 9/32
USPC ............................................................ 100/1
See application file for complete search history.

(56) References Cited

U.S. PATENT DOCUMENTS

| | | | |
|---|---|---|---|
| 7,137,008 B1 | 11/2006 | Hamid et al. | |
| 7,260,724 B1 | 8/2007 | Dickinson et al. | |
| 8,683,597 B1 | 3/2014 | Johansson et al. | |
| 8,756,661 B2 | 6/2014 | Levenberg | |
| 9,185,117 B2 | 11/2015 | Grigg et al. | |
| 2006/0110011 A1* | 5/2006 | Cohen | G06F 21/121 382/115 |
| 2008/0172715 A1 | 7/2008 | Geiger et al. | |
| 2013/0097683 A1 | 4/2013 | Davis et al. | |
| 2014/0337243 A1 | 11/2014 | Dutt et al. | |
| 2014/0337945 A1 | 11/2014 | Jia et al. | |

(Continued)

FOREIGN PATENT DOCUMENTS

| | | |
|---|---|---|
| EP | 1918844 | 5/2008 |
| WO | 2014011997 | 1/2014 |

OTHER PUBLICATIONS

Shi, et al., "Implicit Authentication through Learning User Behavior", In Proceedings of the 13th international conference on Information security, Oct. 25, 2010, 16 pages.

(Continued)

*Primary Examiner* — Ashokkumar B Patel
*Assistant Examiner* — William B Jones
(74) *Attorney, Agent, or Firm* — Workman Nydegger (57) ABSTRACT

Granting a validation period. A method includes receiving user input providing one or more authentication factors. The method further includes receiving information about one or more authentication scales. Based on the strength of the authentication factors received from the user and the information about the one or more authentication scales, the method further includes determining a validation period. The method further includes granting or revoking the validation period to the user.

20 Claims, 4 Drawing Sheets

(56) References Cited

U.S. PATENT DOCUMENTS

| | | | |
|---|---|---|---|
| 2015/0007291 A1* | 1/2015 | Miller | H04L 63/0884 726/7 |
| 2015/0046969 A1 | 2/2015 | Abuelsaad et al. | |
| 2015/0227727 A1 | 8/2015 | Grigg et al. | |
| 2015/0229623 A1 | 8/2015 | Grigg et al. | |
| 2015/0229624 A1 | 8/2015 | Grigg et al. | |
| 2015/0229625 A1* | 8/2015 | Grigg | H04L 63/08 726/6 |
| 2016/0005090 A1* | 1/2016 | Vollenweider | G06Q 10/06 705/26.4 |
| 2017/0109740 A1* | 4/2017 | Besch | G06Q 20/327 |

OTHER PUBLICATIONS

Shinder, Deb., "Understanding and selecting authentication methods", Published on: Aug. 28, 2001 Available at: http://www.techrepublic.com/article/understanding-and-selecting-authentication-methods/.

"International Search Report and the Written Opinion" issued in PCT Application No. PCT/US2017/036247 dated Sep. 7, 2017.

* cited by examiner

SMART AUTHENTICATION FRICTION LEVEL ADJUSTED BASED ON CIRCUMSTANCES

BACKGROUND

Background and Relevant Art

Computers and computing systems have affected nearly every aspect of modern living. Computers are generally involved in work, recreation, healthcare, transportation, entertainment, household management, etc.

Authenticating oneself is one of the first steps users have to go through before they can interact well with an operating system (OS). From the OS developers' point of view, this is an extremely necessary step before the user could be allowed to use the computer. However, users often see this as authentication friction in that the experience slows them down and causes unnecessary hassles. This classic example of security versus usability has evolved over the years with OS developers focusing on implementing more and more innovative and frictionless authentication experiences. To name a few, long complicated passwords from the past have been replaced with short 4-digit PINs, gestures on a favorite picture and even biometric inputs like face scans or iris scans.

With all of these innovations in the credential space, authentication experiences have surely improved for the user. However, users still want to have the seemingly contradictory benefits of high security and low authentication friction.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for granting a validation period. The method includes receiving user input providing one or more authentication factors. The method further includes receiving information about one or more authentication scales. Based on the strength of the authentication factors received from the user and the information about the one or more authentication scales, the method further includes determining a validation period. The method further includes granting or revoking the validation period to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are able to reduce authentication friction (and in some instances, even eliminate authentication friction) in favorable circumstances while still maintaining an appropriate level of security protection when adversity increases above a threshold. This can be accomplished by implementing a "smart" authentication platform that can adjust the authentication friction level based on circumstances including providing a total authentication friction-less experience to the user in favorable situations, but at the same time protecting the user during adversity. This could be used to create an improved computing system that is more quickly accessible by users when adversity is low. In particular, the computer system will be more efficiently accessible in low adversity environments.

The following illustrates some examples.

Figure 1:
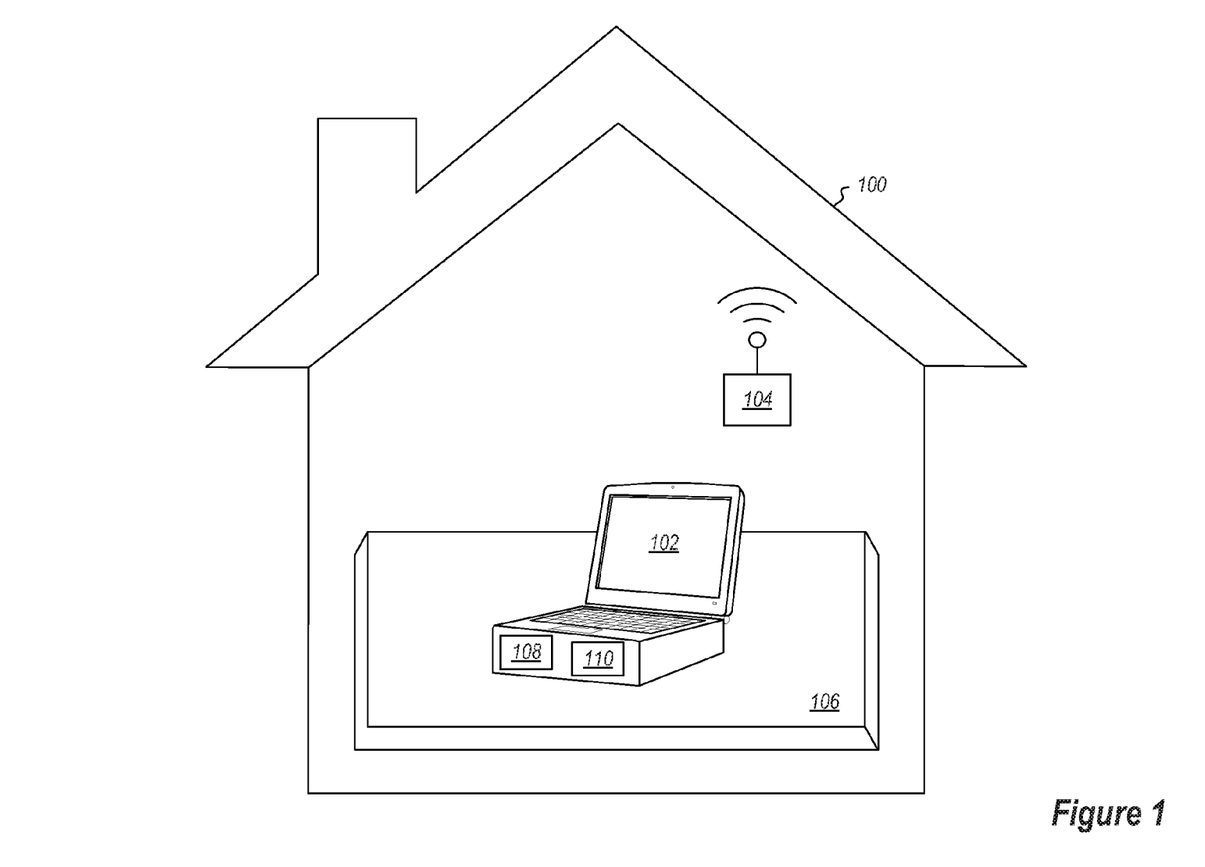
FIG. 1 illustrates a computer system in a user's home environment.

Referring now to FIG. 1, consider a first user's home computing system 102 is connected to a wireless network 104 at her home 100. Using other sensors, the computing system 102 can also detect that it is sitting on its usual location On the kitchen slab 106. When the first user walks up-to the computing system 102 and expresses intent to sign-in (like swiping away a lock screen), an authentication platform 108 on the first user's computing system 102 simply allows the first user to access the computing system 102 without asking any challenge question/credential (or alternatively requiring a relatively simple authentication interaction). However, during a week when the first user is out of town on a vacation, her computing system's authentication platform 108 detects that scenario by integrating with the digital calendar 110 on the computing system 102. When a friend or a visitor tries to use the computing system 102, even though the computer system remains on the slab 106 in the home 100, the friend or visitor is challenged with a request for credentials, and may be challenged with a request for a high-friction credential.

Figure 2:
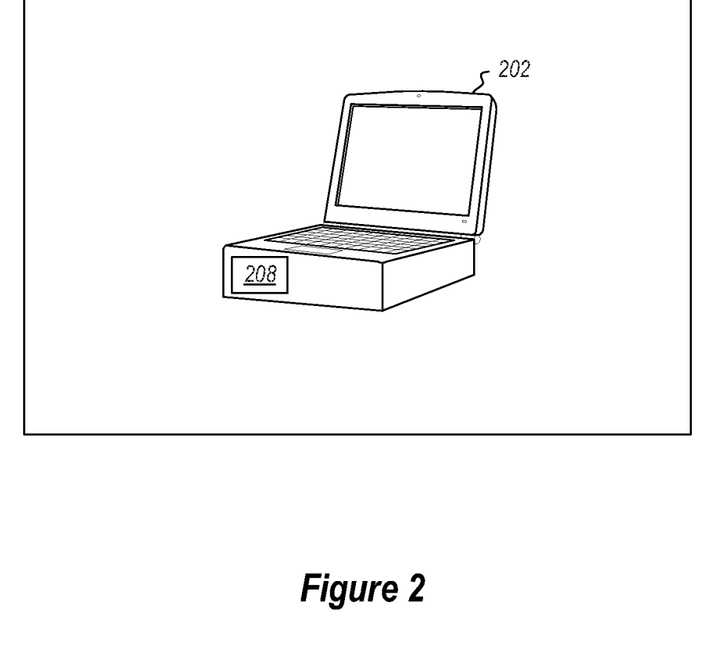
FIG. 2 illustrates a computer system in a user's work environment.

Referring now to FIG. 2, a second user's work computing system 202 knows his working hours to be 9 am to 6 pm. During this time, when second user walks up to the computing system 202, the authentication friction is reduced. For example, the mere presence of his phone in proximity to the computing system 202 provides enough evidence to the authentication platform 208 of presence and he is allowed to use his computing system 202 with little or no authentication friction. However, when a janitor walks in to his office at night, after 6 pm, even when second user might have left his phone at his desk, a challenge question is asked and the computing system 202 is protected.

Embodiments can accomplish this functionality through several different mechanisms. Some embodiments use a so-called adversity quotient. In particular, embodiments can gather various signals (i.e., information) about the circumstances related to a computing system. An "adversity quotient" of the circumstances is computed. When adversity reaches a specific threshold, authentication friction/challenge for authentication is increased or decreased accordingly. Further, authentication certificate validation refresh (i.e., validation periods) times can be adjusted based on circumstances.

To understand adversity quotients, some fundamental concepts are now illustrated.

Figure 3:
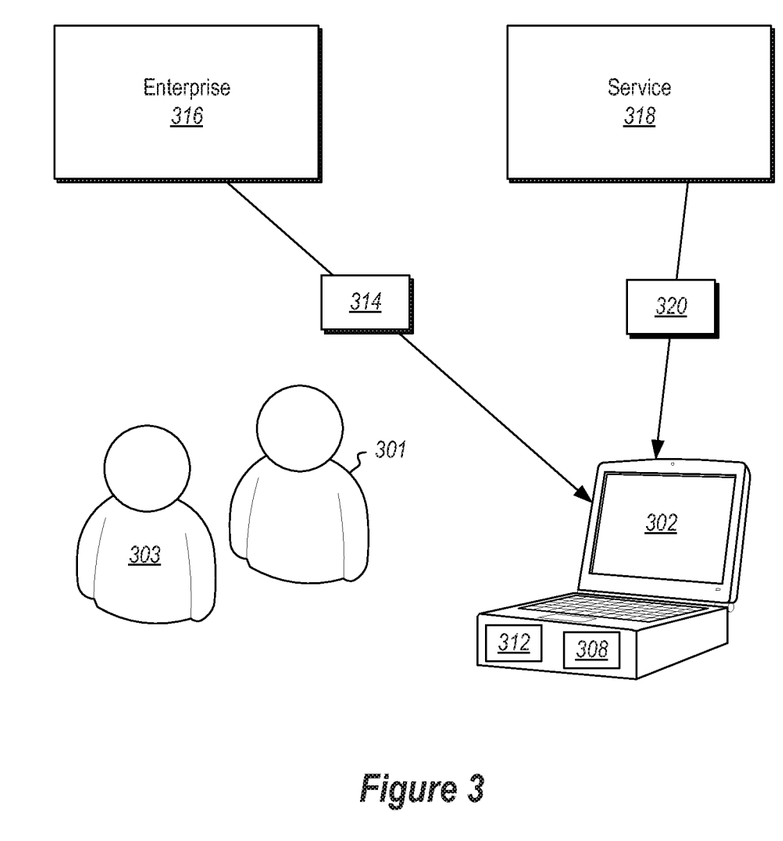
FIG. 3 illustrates a computing system coupled to a service and an enterprise.

A scale is a set of weights and rules that determine the overall operational logic of a rule system. Some embodiments may implement three distinct scales at any given time-1) a user scale, 2) an enterprise scale, and 3) a service scale. With reference to FIG. 3, a user scale determines the weights and rules for the scale 312 that a user 301 wants implemented at their computing system 302. The user 301 could decide to enter these herself at the computing system 302 or let the computing system 302 find the weights and rules for the scale 312 on behalf of the user 301 using some machine learning or other mechanism.

The enterprise scale 314 includes a set of weights and rules pushed down by an enterprise 316 when the user 301 causes the computing system 302 to join a corporate network or configures an email client for corporate emails or other accounts.

A service scale 320 is a scale 320 per service. For example, a service 318 such as banking service could determine a separate scale 320 with weights and rules that it needs to apply on a system.

At any given point, one or more scales are relevant (and there could be more than one service scale, typically one per service and/or more than one enterprise scale, and/or even one or more user scales) where each of these scales has their own weights and rules.

Some embodiments implement a scale definition language. The scale definition language decides how scale is authored. Typically, a scale has a set of rules and weights for the rules, some embodiments, weights of the rules may be implemented for other users signing in on the same computer), mapping of overall score to authentication friction level, and red-flag rules.

A rule includes inputs for a set of information from one or more sensors. Typically each rule has one verb, one or more pieces of sensor information, ranges and happiness, and a default weight (though each scale could overwrite the default weight). For example a rule could be sensor: time of day, verb: time within and ranges: 9:00-17:00: 95% happy, 17:01-23:00: 50% happy and 23:01-8:59: 25% happy.

A rule processing engine can smooth rules and automatically adjust rule weights (e.g., lowers them) at the smoothing zone. For example, in the rule above, 8:55 am in the morning will likely not be 25% happy—it is just 5 minutes before 9:00 am, when it may be expected that a user will be present at the computing system, and it can be smoothed out. Smoothing zones can be defined with proximity to range boundaries in a rule. For example, smoothing zones may be defined as predetermined portion of a range. For example, smoothing zones may be some percentage of the range. Alternatively or additionally, a smoothing zone may be some fixed value applicable to a range. In the example above, the smoothing zone is a fixed value of 5 minutes into a range.

Various different ranges can be defined. For example, as illustrated above, time ranges can be provided. Alternatively or additionally, location ranges can be provided. Note that some ranges may be quite binary. For example, some ranges may include a user simpley entering or exiting a location boundary, or entering or leaving a network.

The following illusustrates a concrete example, A user at 8 am in the morning is still home and their phone is connected to a home WiFi and the phone is located at a home address. The user leaves for work. The user gets in the car and just out of the drive-way and stops to check the building location for an 8:30 am meeting. The phone needs to be unlocked. But by the virtue of the phone just leaving the security boundary (of being on a home WiFi and at a home address location), lower friction could be applied.

In most common cases, a "range" may be based on a time-based smoothing from gaining or losing a signal. However, with a physical address, it could be distance travelled as well. For example, the user leaves home and walk to the neighborhood's community park 200 yards away from home. The phone could detect 150 yards (e.g., using an accelerometer or other detection methods) from the home door and still identify that is in a safe range where friction can be reduced.

A rule definition language may be used to define a rule.

A scale adversity quotient determines the overall adversity for a given scale at a given point. Based on a combination of all relevant scales at a given time, and their cumulative adversity, an overall adversity is computed and the user is granted an authentication friction level.

Each scale defines a tipping factor. These could be one or more rules that could cause adversity to reach a triggering threshold asynchronously.

Reaching a triggering threshold may result in the computing system requiring more secure authentication, shortening a certificate validation period, revoking a certificate, and/or other security actions, Embodiments may implement a validation period. When a user is offered a certain authentication friction level, it is associated with some validation to avoid further computation within that period. However, using scale tipping factors, the validation period is revoked or shortened when certain criteria thresholds are met for a relevant scale.

An example is now illustrated with reference to FIG. 3. In this example, the user 301 buys a new device, computing system 302, and sets up their own scale 312 including authentication friction rules. This scale 312 is her user scale 312 and one with which she has full control. Because the computing system 302 is a client computer, she installs new software components as part of the authentication platform 308 that allows her to configure more rules. Additionally, the authentication platform may include machine learning that allows the authentication platform to be more effective at balancing authentication friction and security protection over time. and it is automatically getting better over time with more installs.

After using the computing system 302 and the authentication platform 308 for some time, the user 301 decides to add her husband (user 303) on the same computer. User 303 sets his own user scale. After a while, user 301 connects corporate email to the mail client on the computing system 302. At this point, an enterprise scale 314 is pushed down to her computing system 302. This enterprise scale 314 aligns with her user scale 312 at some places but contradicts (by having either stronger or weaker requirements) her existing user scale 312 in some other places. The enterprise scale 314, in this example, is device wide, so it applies for user 301 and user 303, though the overall weight is much stronger for user 301 than user 303. User 303 notices that the enterprise scale 314 is impacting some of his usage.

At some point, user 301 installs a banking application on the device and gets a service scale 320 for her bank on the machine. These scales are now all relevant. However, the authentication platform may provide an indication (e,g., through a user interface) such that she is able to see which scale or combination of scales is causing her experience. In some embodiments, the user 301 may determine that a scale has too much of an adverse effect and she can opt out of any scale by removing the service (like uninstalling the banking app or disconnecting from corporate email).

When user 301 signs in to the computing device, all three scales are computed and appropriate policy is applied to determine any needed conflict resolution strategy. The policy could specify, for example, that the most restrictive scale wins. Alternately, or additionally the policy could specify that as long as threshold tipping factors of any scale are not met, the user gets a more average experience of all scales. There are many different algorithms that can be applied to implement different policies. Based on the overall outcome, the user 301 sees a given authentication experience. In particular, depending on the outcome of evaluating the scales, a particular authentication experience with a particular authentication friction will be provided to the user. In particular, the amount of effort required by a user to authenticate can be adjusted based on the evaluation of the scales. This could range from no authentication input required, to a simple four digit pin, to a complex password, to presentation of external factors (such as smart cards, phones, or other devices). Embodiments may allow for a grace period/condition combination as defined by a validation period, which may be defined in a validation certificate. This means within the validation period, as long as the set of conditions are true, the user 301 will stay at that authentication level. In particular, there can be some authentication friction inertia. For example, while scale evaluation with first results might call for a first authentication fiction level in a first instance, if the system is at a different second authentication level and the first results are obtained from scale evaluation, the system will not necessarily switch to the first authentication friction level. Rather, the system will remain at the second authentication friction level until some tipping factor condition occurs. A scale tipping factor for a scale will force a revocation of the validation period forcing a re-computation of the state and new determination of the friction level without regard to friction level inertia.

In the illustrated example, the weight of service and enterprise scales are lower for user 303. However, those scales may still be applied because the apps or subscriptions associated with the service(s) and/or enterprise(s) generally want to secure the device overall and hence for all users. However, the scale may allow for a lower authentication friction level when the apps or subscriptions themselves are not being used by a user. This may be particularly true when the apps or subscriptions are not even accessible by the user. Thus, in some embodiments, authentication friction may be determined by what apps and/or subscriptions are available to the user.

In some embodiments, switching the authenticated user for a computing system forces a re-computation of the scale condition for the new (about to sign-in) user.

Thus, as illustrated, authentication friction level is not a binary 1 or 0 level. Instead, the authentication friction level can be a real variable number line that users, services, enterprises, etc. can manage: An authentication friction scale can be a continuous scale that can have multiple levels based on various signal strengths. Not all signals are equally strong and appropriate weight is applied on each signal.

Embodiments can allow the user to be in full control at all times. Further, audit logs offer complete traceability. Embodiments allow users to have complete control over their experience. For example, some embodiments may include graphical user interface settings pages that allow users to decide how conservative or aggressive their authentication engine should be.

Embodiments may be implemented where machine learning improves the experience over time: Various machine learning techniques can be used to improve the authentication experience even further. For example, some embodiments may use clustering techniques to cluster signal states during good and bad logons which will allow the authentication engine to learn about the uses usage behavior. For example, a lunch-time visit to a cafe shop and connecting to the Wi-Fi network there might be safe but the same Wi-Fi network in the evening might be determined to not be so safe because the user generally doesn't visit there in the evening. The following illustrates additional details regarding machine learning.

One way machine learning can be used is by clustering for defining a user authentication scale. If the user chooses that the computer learns her usage pattern to compute the user scale, then this method is applied. Embodiments can build an n-dimension system, where each dimension is sensor information. Embodiments then plot good and bad attempts on n-dimensions to determine clusters of good and bad segments. Those clusters are then consumed to determine a user scale, i.e., a set of rules and weights that reduce the training error significantly. At the same time, to guard against overfitting, embodiments may re-compute the user scale at a few subsequent intervals and perform cross validation to ensure that a good scale has been obtained. In some embodiments, the scale changes over time as data beyond a retention period gets purged.

Cross-validation can correct the training error and derive a more accurate model prediction. Usually for a prediction model, training data and unknown data is provided. Then embodiments use cross-validation to define a dataset to test the model, to limit problems such as overfilling. During cross-validation, a set of sample data is divided into multiple subset properly. Embodiments use one subset as training data to train the model, and use another subset to validate the analysis. Usually multiple rounds are implemented to reduce variability.

Another way machine learning can be used is by using K-Nearest Neighbors (KNN) for scale applications. When applying various scales towards computing overall adversity, machine learning (KNN) could be used as well. In this case, embodiments start by overlaying all rule results on top of each other. Embodiments then degenerate them into sensor information and observe similar patterns in the past. This also allows the user to periodically train the system where she can help identify certain combination of sensors information to be fair. Then embodiments observe how far the current sensor situation is from nearest good and bad situations and apply descending weights from nearest to farthest situations and compute overall adversity.

In some embodiments, certificate validation periods can be determined based on an authentication factor received from the user in addition to evaluating authentication scales. For example, the user may have the option to provide one or more of a number of different authentication factors, such as a PIN, a simple password, a complex password, a picture swipe pattern, smart card presence, cell phone presence, etc. The user can select which authentication factors to provide and can provide multiple authentication factors if the user so chooses. Based on the authentication factors provided by the user, the system evaluates these using the authentication scales. This evaluation results in the determination of a validation period. For example, the validation period may define the length of time that a security certificate is valid and adjust the length of time that the user is able to use the computing system 302.

For example, in some situations, even though the user provides a relatively weak authentication factor such as a PIN, the authentication scales may nonetheless indicate that a certificate may be granted for a reasonably long period of time due to the absence of other risk factors. Alternatively, if other risk factors exist, and a user only provides a relatively weak authentication factor such as a PIN, then the certificate may have a shorter expiration period, resulting in the user needing to re-authenticate once the certificate expires. Alternatively, a user could provide a stronger authentication factor, such as a complex password, which would allow for the issuance of a certificate having a longer expiration period.

In some embodiments, evaluation of authentication scales may result in the complete revocation of an authentication certificate. Even though the authentication certificate has been specified with a given expiration period, the occurrence of some event may cause the authentication certificate to be completely revoked prior to the expiration of the expiration period.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
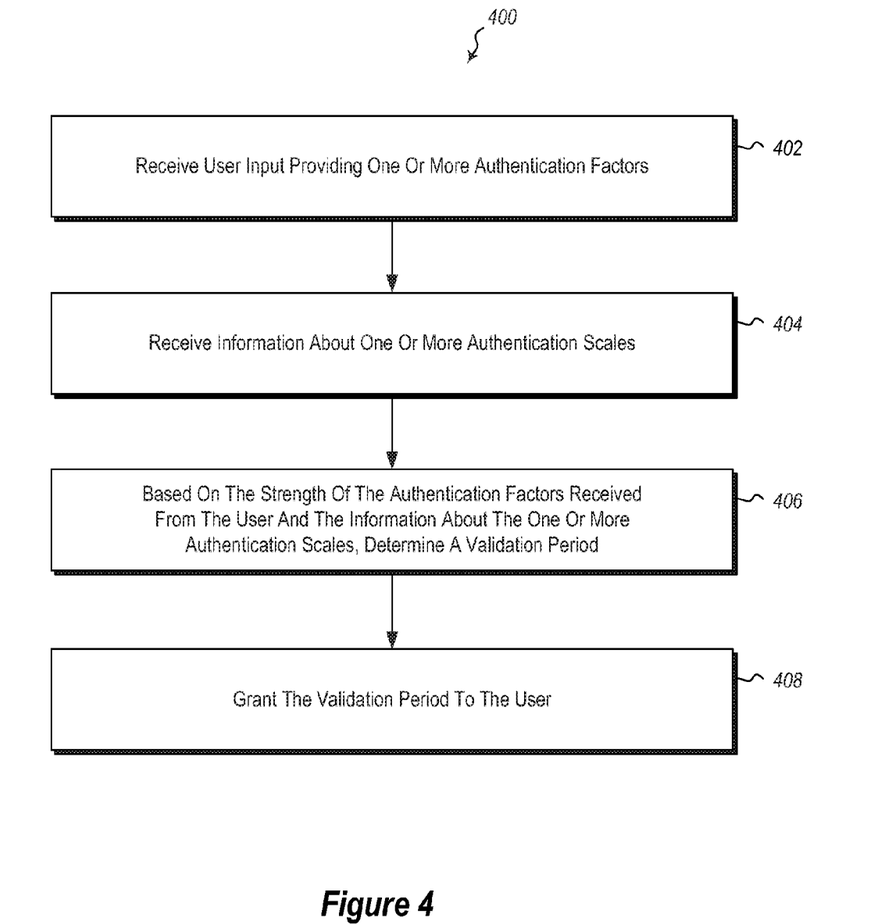
FIG. 4 illustrates a method of granting a validation period.

Referring now to FIG. 4, a method 400 is illustrated. The method 400 includes acts for granting a validation period.

The method 400 includes receiving user input providing one or more authentication factors (act 402). For example, the user may provide one or more of a PIN, a simple password, a complex password, a picture swipe pattern, smart card presence, cell phone presence, etc. In other embodiments, authentication factors may be determined such as by determining computing system location, time of day, etc. In some embodiments, an action, such as simply swiping a lock screen or pressing a power button, may be provided.

The method 400 further includes receiving information about one or more authentication scales (act 404). For example, a user's computer may provide one set of authentication rules defined by the user themselves. Alternatively or additionally, another set of authentication rules may be provided by a service to which the user is connected, or to which the user is attempting to connect, that has applications related to the service installed on the user's computing system, to which the user has subscribed, etc. Alternatively or additionally, an enterprise may provide another set of authentication rules as a result of a user using their computer system for work-related functions. Those of skill in the art will recognize that other authentication scales may additionally or alternatively provided.

Based on the strength of the authentication factors received from the user and the information about the one or more authentication scales, the method further includes determining a validation period (act 406). For example, if a weak authentication factor is used (e.g., a PIN) and there is an indication from an authentication scale that this may be risky, a certificate will have a short validation period. Alternatively if a strong authentication factor is used (e.g., a long password) then a certificate may have a long validation period. The strength of the authentication factor may have different weights at different times. For example, sometimes the authentication scales may indicate that conditions are very safe, and thus, weak authentication factors may be provided and still allow for a relatively long validation period as compared to a shorter validation period provided when conditions are less safe. The validation period will be affected by evaluation of the authentication factors provided and the authentication scales analyzed. In some embodiments, the validation period may be 0, essentially denying access if the conditions are too unsafe for the authentication factor provided.

The method 400 further includes granting or revoking the validation period to the user (act 408).

The method 400 may be practiced where the information about one or more authentication scales comprises information about a user scale comprising weights and rules configured by a computing system user, a service scale comprising weights and rules provided by a computing service, and an enterprise scale comprising rules and weights provided by an enterprise.

The method 400 may further include smoothing rules from the authentication scales at one or more smoothing zones.

The method 400 may further include identifying that a tipping factor has been triggered, as a result, shortening the validation period.

The method 400 may further include identifying that a tipping factor has been triggered, as a result, revoking the validation period.

The method 400 may further include identifying that a tipping factor has been triggered, as a result, requiring one or more stronger authentication factors from the user.

The method 400 may further include automatically re-computing an authentication scale using machine learning.

The method 400 may be practiced where the information about one or more authentication scales comprises rules specifying time of day ranges.

The method 400 may be practiced where the information about one or more authentication scales comprises rules specifying locations.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon instructions that are executable by the one or more processors to configure the computer system to grant a validation time-period for access to the computer system, including instructions that are executable to configure the computer system to perform at least the following:
   receive, at the computer system, one or more environmental sensor signals;
   compute, at the computer system, an adversity quotient at least based on the one or more environmental sensor signals;
   determine, at the computer system, that the adversity quotient meets an adversity quotient threshold;
   based at least on determining that the adversity quotient threshold has been met, present a user with a prompt to provide at least one of a plurality of different authentication factors that are each valid at the adversity quotient threshold for accessing the computer system;
   identify, at the computer system, one or more authentication scales that rank a strength of each of the plurality of different authentication factors, wherein the strength of each of the plurality of different authentication factors is usable to determine a length of a validation time-period, the length of the validation time-period being longer for a more strongly-ranked authentication factor than it is for a more weakly-ranked authentication factor;
   receive, at the computer system, a user input providing the at least one of the plurality of different authentication factors;
   determine, at the computer system, the strength of the at least one of the plurality of different authentication factors received in the user input;
   based on the strength of the at least one of the plurality of different authentication factors received from the user input, determine, at the computer system, the length of validation time-period, during which time-period the user has access to the computer system; and grant the user access to the computer system for the length of the validation time-period, avoiding re-computing at least the adversity quotient during the validation time-period.

2. The computer system of claim 1, wherein the one or more authentication scales comprises information about a user scale comprising weights and rules configured by a computing system user, a service scale comprising weights and rules provided by a computing service, and an enterprise scale comprising rules and weights provided by an enterprise.

3. The computer system of claim 1, wherein the one or more computer-readable hardware storage devices further have stored thereon instructions that are executable by the one or more processors to configure the computer system to smooth rules from the one or more authentication scales at one or more smoothing zones.

4. The computer system of claim 1, wherein the one or more computer-readable hardware storage devices further have stored thereon instructions that are executable by the one or more processors to configure the computer system to identify that a tipping factor has been triggered, and as a result, shorten the validation time-period, wherein triggering the tipping factor occurs when the computing system identifies that a change has occurred to the adversity quotient at least based on a change to the one or more environmental sensor signals.

5. The computer system of claim 1, wherein the one or more computer-readable hardware storage devices further have stored thereon instructions that are executable by the one or more processors to configure the computer system to identify that a tipping factor has been triggered, and as a result, revoke the validation time-period.

6. The computer system of claim 1, wherein the one or more computer-readable hardware storage devices further have stored thereon instructions that are executable by the one or more processors to configure the computer system to identify that a tipping factor has been triggered, and as a result, require one or more stronger authentication factors from the user.

7. The computer system of claim 1, wherein the one or more computer-readable hardware storage devices further have stored thereon instructions that are executable by the one or more processors to configure the computer system to automatically re-compute at least one authentication scale using machine learning.

8. The computer system of claim 1, wherein information about the one or more authentication scales comprises rules specifying time of day ranges.

9. The computer system of claim 1, wherein information about the one or more authentication scales comprises rules specifying locations.

10. A method, implemented at a computer system that includes one or more processors, of granting a validation time-period for access to the computer system, the method comprising:
  receiving, at the computer system, one or more environmental sensor signals;
  computing, at the computer system, an adversity quotient at least based on the one or more environmental sensor signals;
  determining, at the computer system, that the adversity quotient meets an adversity quotient threshold;
  based at least on determining that the adversity quotient threshold has been met, presenting a user with a prompt to provide at least one of a plurality of different authentication factors that are each valid at the adversity quotient threshold for accessing the computer system;
  identify, at the computer system, one or more authentication scales that rank a strength of each of the plurality of different authentication factors, wherein the strength of each of the plurality of different authentication factors is usable to determine a length of a validation time-period, the length of the validation time-period being longer for a more strongly-ranked authentication factor than it is for a more weakly-ranked authentication factor;
  receive, at the computer system, a user input providing the at least one of the plurality of different authentication factors;
  determine, at the computer system, the strength of the at least one of the plurality of different authentication factors received in the user input;
  based on the strength of the at least one of the plurality of different authentication factors received from the user input, determining, at the computer system, the length of the validation time-period, during which time-period the user has access to the computer system; and
  granting the user access to the computer system for the length of the validation time-period, avoiding re-computing at least the adversity quotient during the validation time-period.

11. The method of claim 10, wherein the one or more authentication scales comprises information about a user scale comprising weights and rules configured by a computing system user, a service scale comprising weights and rules provided by a computing service, and an enterprise scale comprising rules and weights provided by an enterprise.

12. The method of claim 10 further comprising smoothing rules from the one or more authentication scales at one or more smoothing zones.

13. The method of claim 10 further comprising identifying that a tipping factor has been triggered, and as a result, shortening the validation period.

14. The method of claim 10 further comprising identifying that a tipping factor has been triggered, and as a result, revoking the validation period.

15. The method of claim 10 further comprising identifying that a tipping factor has been triggered, and as a result, requiring one or more stronger authentication factors from the user.

16. The method of claim 10 further comprising automatically re-computing an authentication scale using machine learning.

17. The method of claim 10, wherein information about the one or more authentication scales comprises rules specifying time of day ranges.

18. The method of claim 10, wherein information about the one or more authentication scales comprises rules specifying locations.

19. A computer program product comprising one or more computer-readable hardware storage devices having stored thereon instructions that are executable by one or more processors to configure a computer system to grant a validation time-period for access to the computer system, including instructions that are executable to configure the computer system to perform at least the following:
  receive, at the computer system, one or more environmental sensor signals;

compute, at the computer system, an adversity quotient at least based on the one or more environmental sensor signals;

determine, at the computer system, that the adversity quotient meets an adversity quotient threshold;

based at least on determining that the adversity quotient threshold has been met, present a user with a prompt to provide at least one of a plurality of different authentication factors that are each valid at the adversity quotient threshold for accessing the computer system;

identify, at the computer system, one or more authentication scales that rank a strength of each of the plurality of different authentication factors, wherein the strength of each of the plurality of different authentication factors is usable to determine a length of a validation time-period, the length of the validation time-period being longer for a more strongly-ranked authentication factor than it is for a more weakly-ranked authentication factor;

receive, at the computer system, a user input providing the at least one of the plurality of different authentication factors;

determine, at the computer system, the strength of the at least one of the plurality of different authentication factors received in the user input;

based on the strength of the at least one of the plurality of different authentication factors received from the user, determine, at the computer system, the length of the validation time-period, during which the user has access to the computer system; and grant the user access to the computer system for the length of the validation time-period, avoiding re-computing at least the adversity quotient during the validation time-period.

20. The computer program product of claim 19, wherein the one or more authentication scales comprises information about a user scale comprising weights and rules configured by a computing system user, a service scale comprising weights and rules provided by a computing service, and an enterprise scale comprising rules and weights provided by an enterprise.

* * * * *